(12) United States Patent
Lin et al.

(10) Patent No.: US 6,486,224 B2
(45) Date of Patent: Nov. 26, 2002

(54) POLYURETHANE ELASTOMERS HAVING IMPROVED HYDROLYSIS RESISTANCE

(75) Inventors: Nai Wen Lin, Rochester Hills; Ravi R. Joshi, Auburn Hills, both of MI (US)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 09/938,215

(22) Filed: Aug. 23, 2001

(65) Prior Publication Data

US 2002/0040071 A1 Apr. 4, 2002

Related U.S. Application Data

(63) Continuation of application No. PCT/US00/04398, filed on Feb. 22, 2000.
(60) Provisional application No. 60/121,292, filed on Feb. 23, 1999.

(51) Int. Cl.⁷ .............. C08J 9/04; C08J 9/08; C08J 9/12; C08J 9/14; C08G 18/42
(52) U.S. Cl. ............ 521/159; 521/51; 521/113; 521/130; 521/131; 521/172; 521/173
(58) Field of Search .................. 521/113, 130, 521/131, 159, 172, 173, 51

(56) References Cited

U.S. PATENT DOCUMENTS

| | | | | |
|---|---|---|---|---|
| 4,246,365 A | * | 1/1981 | Wiedermann et al. | 521/172 |
| 4,400,477 A | * | 8/1983 | Blanpied | 521/112 |
| 4,714,717 A | * | 12/1987 | Londrigan et al. | 521/131 |
| 5,840,782 A | | 11/1998 | Limerkens et al. | 521/174 |
| 6,284,811 B1 | * | 9/2001 | Sawai et al. | 521/159 |

FOREIGN PATENT DOCUMENTS

| | | |
|---|---|---|
| EP | 0 013 461 A1 | 7/1980 |
| EP | 0 795 572 A2 | 9/1997 |

* cited by examiner

*Primary Examiner*—Rabon Sergent
(74) *Attorney, Agent, or Firm*—Nicole Peffer

(57) ABSTRACT

The disclosed invention relates to a polyurethane elastomer that has improved hydrolysis resistance. The polyurethane elastomer is made by reacting a polyol blend of an aromatic dicarboxylic acid based polyester polyol, an aliphatic dicarboxylic acid based polyester polyol, and a blowing agent. The polyol blend is reacted with an isocyanate terminated prepolymer. The aromatic dicarboxylic acid based polyester polyol is the reaction product of an aliphatic alcohol and ortho-phthalic acid. The aliphatic dicarboxylic acid based polyester polyol is the reaction product of adipic acid and glycols.

17 Claims, No Drawings

POLYURETHANE ELASTOMERS HAVING IMPROVED HYDROLYSIS RESISTANCE

This application is a continuation of international application No. PCTU.S.00/04398, filed Feb. 22, 2000 (status, abandoned, pending, etc.).

This application claims the benefit of U.S. Provisional Application No. 60/121,292, filed on Feb. 23, 1999, the subject matter of which is herein incorporated by reference.

TECHNICAL FIELD

The invention relates to hydrolysis resistant polyester polyurethane elastomers. More particularly, the invention relates to polyurethane elastomers for use in footwear, especially shoe soles.

BACKGROUND ART

Polyester polyurethanes for applications such as footwear should have excellent flexural properties and hydrolysis resistance. Polyester polyurethane elastomers made with aromatic ester polyols such as o-phthalic acid polyester polyols have excellent hydrolysis resistance. However, these elastomers have poor flexural properties. Polyester polyurethanes made with aliphatic polyester polyols such as adipic acid polyester polyols have excellent flexibility, but poor hydrolysis resistance.

Polyester polyurethane elastomers made with aliphatic polyester polyols such as adipic acid based polyols have employed additives such as caprolactone polyols and carbodiimides such as Staboxyl I in an attempt to achieve improved properties. Caprolactone polyols, however, are undesirably expensive. Use of carbodiimides such as Staboxyl I do not produce polyester polyurethane elastomers which have satisfactory hydrolysis resistance as gauged by retained tensile strength after aging in humid environments.

Retained tensile strength of polyester polyurethanes made with aliphatic polyester polyols which include Staboxyl I is only about 60–70% of the original tensile strength after humid aging at 70° C. and 100% relative humidity for seven days. For applications wherein the polyester polyurethanes are employed as shoe soles, the retained tensile strength is desirably about 75–90% of the tensile strength prior to aging.

A need therefore exists for polyester polyurethane formulations which can be used to produce polyurethanes which show improved hydrolysis resistance and which avoid the disadvantages of the prior art.

DISCLOSURE OF THE INVENTION

The invention relates to polyurethanes having improved hydrolysis resistance and tensile strength retention. The polyurethanes are made by reacting an isocyanate terminated prepolymer with a polyol component which includes a polyester polyol blend made from an aliphatic carboxylic acid based polyester polyol, preferably adipic acid based polyester polyol, and an aromatic carboxylic acid based polyester polyol, preferably o-phthalic acid based polyester polyol.

More specifically, the polyurethane elastomers are made by reacting a first component comprising a polyol component having a blend of an aromatic dicarboxylic acid based polyester polyol, and an aliphatic dicarboxylic acid based polyester polyol, a blowing agent and preferably, a chain extender, with an isocyanate terminated prepolymer. The aromatic dicarboxylic acid based polyester polyol is the reaction product of an aliphatic alcohol and ortho-phthalic acid. The aliphatic alcohol is any of ethylene glycol, diethylene glycol, hexanediol, and neopentyldiol. The aliphatic dicarboxylic acid is any of adipic acid, succinic acid, glutaric acid, and suberic acid. The aromatic polyester polyol is present in the polyol blend in an amount of about 12 wt. % to about 26 wt. %, preferably about 15 wt. % to about 20 wt. %, based on the weight of the polyol blend, remainder aliphatic polyester polyol. In a preferred aspect, the ortho-phthalic acid reacted with the aliphatic alcohol has less than about 10 wt. % total of tere-phthalic acid and isophthalic acid.

The aliphatic dicarboxylic acid based polyester polyol is the reaction product of adipic acid and glycol or glycols such as ethylene glycol, diethylene glycol, and 1,4-butanediol, and has an OH value of about 36 to about 56. The blowing agent is any of water, acetone, pentane, hexane, cyclopentane, (1,1,1,2-tetrafluoroethane), (1,1,1,3,3-pentafluoropropane), (1,1,2,2,3-pentafluoropropane), (1,1,1,2,3,3-hexafluoropropane), and methylene chloride, preferably water in an amount of about 0.02% to about 1.2% by weight based on the total weight of the polyol component.

In a more preferred aspect, the polyurethane elastomers of the invention are the reaction products of a first component comprising a polyol component that includes a polyol blend formed of an aliphatic polyester polyol and an aromatic polyester polyol, with a second component that is a diphenylmethane diisocyante prepolymer having about 15% NCO to about 24% NCO. The aliphatic polyester polyol is the reaction product of adipic acid with diethylene glycol and ethylene glycol. The aromatic polyester polyol is the reaction product of diethylene glycol with ortho-phthalic acid. The aromatic polyester polyol is present in an amount of about 15 wt. % to about 20 wt. % of the polyol blend, remainder aliphatic polyester polyol. The polyol component also includes 1,4 butanediol as a chain extender and water as a blowing agent.

Having summarized the invention, the invention is described in detail below by reference to the following detailed description and non-limiting examples.

MODES FOR CARRYING OUT THE INVENTION

Glossary

The following trade name materials and terms have the meanings given below:

1. Dabco S25 from Air Products Co. is triethylene diamine in 1,4-butanediol.
2. Daltorez P716 from Huntsman Polyurethanes, Inc. is an ethylene glycol/diethylene glycol/adipic acid polyester polyol having a functionality of 2.0, and OHv=56.
3. Daltorez P720 from Huntsman Polyurethanes, Inc. is a polyester polyol made of Ethylene glycol/1,4-butane diol/adipic acid, Fn=2, OHv=55
4. Daltorez P778 from Huntsman Polyurethanes, Inc. is a ethylene glycol/diethylene glycol/adipic acid polyester polyol having a functionality of 2.0, a MW of 2500, and a $OH_v$=45.
5. Daltorez P779 from Huntsman Polyurethanes, Inc. is an ethylene glycol/diethylene glycol/adipic acid polyester polyol having a functionality of 2.0 and OHv=37.
6. Daltoped AP 17108 is a polyester polyol blend from Huntsman Polyurethanes, Inc.;
7. Daltoped HF 54615 is a polyester polyol blend available from Huntsman Polyurethanes, Inc. Daltoped HF 54615 includes 86.5% Daltorez P716, 9.6% 1,4-Butanediol, 2.8% Dabco S-25, 0.47% Niax DEOA-LF, 0.3% DC-193 and 0.33% water.
8. DC-193 is a silicone surfactant from Air Products Co.
9. Formrez 8009-146 from Witco Co. is an isophthalic acid polyester polyol having a functionality of 2.0 and a $OH_v=146$.
10. Niax DEOA-LF is diethanol amine from Union Carbide Co.
11. Staboxyl I from Rhien Chemie is bis 2,2',6,6' tetra isopropyl-diphenyl carbodiimide.
12. Rubinate 1680 is a uretonimine modified MDI from Huntsman Polyurethanes, Inc.
13. Rubinate 9044 is diphenylmethane diisocyanate from Huntsman Polyurethanes, Inc.
14. Rubinol F 481 is a polyether polyol made from EO/PO, EO capped, OHv=30 diol from Huntsman Polyurethanes, Inc.
15. Stepanpol PS 1752 from Stepan Co. is diethylene glycol-orthophthalic anhydride based polyester polyol having a MW of 640, a functionality of 2.0 and an hydroxyl number of 160–180 mg KOH/gm.
16. Stepanpol PS-3152 from Stepan Co. is a diethylene glycol-phthalic anhydride based polyester polyol a diethylene glycol-phthalic anhydride based polyester polyol having a functionality of 2.0, a MW of 356, and an hydroxyl number of 300–330 mg KOH/gm.
17. Stepanpol PD-110LV from Stepan Co. is a diethylene glycol/ortho-phthalate based polyester polyol having a functionality of 2.0, a MW of 975, and an hydroxyl number of 110–120 mg KOH/gm.
18. Stepanpol PH-56 from Stepan Co. is a ortho phthalate-1,6-hexanediol polyester polyol having a functionality of 2.0, and an hydroxyl number of 53–59 mg KOH/gm.
19. Stepanpol PN-110 from Stepan Co. is an ortho phthalate-neopentyl glycol polyester polyol having a functionality of 2.0, and an hydroxyl number of 110–120 mg KOH/gm.
20. Stepanpol PS 20–200A from Stepan Co. is an orthophthalate-diethylene glycol polymer polyol having hydroxyl number of 190–200, and a functionality of 2.0.
21. Stepanpol PS 2002 from Stepan Co. is an orthophthalate diethylene glycol polyester polyol having hydroxyl number of 200, and a functionality of 2.0.
22. Suprasec 2000 from Huntsman Polyurethanes is a diphenylmethane diisocyanate prepolymer that is the reaction product of a polyester polyol and diphenylmethane diisocyante, and having a 17% NCO. The polyester polyol is the reaction product of a blend of ethylene glycol/diethylene glycol with adipic acid.
23. Suprasec 2433 from Huntsman Polyurethanes is a diphenylmethane diisocyanate prepolymer that is the reaction product of polyether polyol and diphenylmethane diisocyante, and having 18.7 to 19.3% NCO. The polyether polyol is EO/PO and EO capped diol.
24. Suprasec 2544 from Huntsman Polyurethanes is an diphenylmethane diisocyanate prepolymer having 19% NCO. It is the reaction product of Rubinate 9044, Rubinol F 481, Daltorez P720, and Rubinate 1680.
25. Molecular weight, unless otherwise specified, is number average.

In the present invention, a polyol component formed from a blend of an aromatic polyester polyol and an aliphatic polyester polyol is reacted with an isocyanate prepolymer to produce a polyurethane having greatly improved hydrolysis resistance. The polyol component includes suitable catalysts, blowing agents, and optionally, chain extenders and additives.

Aromatic polyester polyols for use in the polyol component may be prepared by polycondensation of aromatic dicarboxylic acids or dicarboxylic acid derivatives, for example aromatic dicarboxylic acid anhydrides or aromatic diesters, with aliphatic diols and/or triols. Suitable aromatic dicarboxylic acids are terephthalic acid and ortho-phthalic acid, preferably, ortho-phthalic acid. More preferably, the aromatic dicarboxylic acid is ortho-phthalic acid that has less than about 10% of terephthalic acid and isophthalic acid. Other suitable aromatic acids which may be used to prepare the prepolymer include mixtures of the ortho-phthalic acid with fatty acid dimers such as C18 fatty acid dimers.

Aliphatic diols and triols which may be used to prepare the aromatic polyester polyols are, for example: ethanediol, diethylene glycol, 1,4-butanediol, neopentyl glycol, 1,6 hexanediol, 1,3- and 1,2-propanediol, dipropylene glycol, triethylene glycol, tetraethylene glycol, glycerin, trimethylolpropane and triethylolpropane, preferably diethylene glycol.

The aromatic polyester polyols are prepared from any of tere-phthalic acid, isophthalic acid, ortho-phthalic acid or mixtures thereof and ethylene glycol and/or diethylene glycol. More preferably, the aromatic polyester polyols are prepared from ortho-phthalic acid and ethylene glycol and/or diethylene glycol. Preferably, the aromatic polyester polyol is formed from ortho-phthalic acid having a molecular weight of about 256 to about 3000, preferably about 344 to about 1500, more preferably about 640.

The aromatic polyester polyols which may be used have molecular weights of from about 256 to about 3000, preferably from about 344 to about 1500, and functionalities of 2 to 3, preferably 2. These aromatic polyols have acid numbers less than 3, more preferably about 0.2 to 0.8, and hydroxyl numbers from about 37 to about 438, preferably about 75 to about 315.

Examples of commercially available aromatic polyester polyols for use in the invention include Stepanpol PS-3152, Stepanpol PS 20–200A, Stepanpol PS 2002, Stepanpol PS 1752, Stepanpol PD-110LV, Stepanpol PH-56, and Stepanpol PN-110, preferably Stepanpol PS 1752.

Aliphatic polyester polyols which may be used can be prepared, for example, from organic dicarboxylic acids having from 2 to 12 carbon atoms, preferably aliphatic dicarboxylic acids having from 4 to 6 carbon atoms, more preferably 6 carbon atoms, and polyfunctional alcohols, preferably diols having from 2 to 12 carbon atoms, more preferably from 2 to 4 carbon atoms. Typical dicarboxylic acids are: succinic acid, glutaric acid, adipic acid, and suberic acid, preferably adipic acid. The dicarboxylic acids may be used individually or in mixtures with one another. preferably, adipic acid is used alone. Instead of the free dicarboxylic acids, corresponding dicarboxylic acid derivatives may be used, for example dicarboxylic acid esters of alcohols having from 1 to 4 carbon atoms, or dicarboxylic anhydrides.

Examples of di- and polyfunctional alcohols which may be used, in particular, diols are: ethanediol, diethylene glycol, 1,2- and 1,3-propanediol, dipropylene glycol, 1,4-butanediol, 1,5-pentanediol, 1,6-hexanediol, 1,10-decanediol, preferably diethylene glycol. Examples of triols are glycerin and trimethylolpropane, preferably used are ethylene glycol and diethylene glycol. The polyester polyols preferably have a functionality of from 2 to 3 and a molecular weight of from 1000 to 3000, more preferably from 1800 to 2500, and functionality of from 2.0 to 2.2.

Examples of commercially available aliphatic polyester polyols for use in the invention include Daltorez P716, Daltorez P778, Daltorez P779, and Daltorez P778, preferably Daltorez P778.

The aromatic polyester polyol and the aliphatic polyester polyol may be blended in weight ratios of aromatic polyester polyol:aliphatic polyester polyol of about 13:87 to about 28.7:71.3, preferably about 16.6:83.4 to about 22:78. The aromatic polyester polyol preferably is Stepanpol PS 1752 and the aliphatic polyester polyol is Daltorez P778, and the weight ratio of Stepanpol PS 1752 to Daltorez P778 is about 13:87 to about 28.7:71.3, preferably about 16.6:83.4 to about 22:78.

Suitable catalysts for use in the polyol component include, tertiary amine catalysts and organometallic catalysts. Some examples of organometallic catalysts include, organometallic compounds of lead, iron, bismuth, and mercury.

Examples of amine catalysts include trialkyl amines and heterocyclic amines. Suitable compounds include, for example, trimethylamine, triethylamine, tripropylamine, tributylamine, dimethylcyclohexylamine, dibutylcyclohexylamine, dimethylethanolamine, triethanolamine, diethylethanolamine, ethyldiethanolamine, dimethylisopropanolamine, triisopropanolamine, triethylene diamine, tetramethyl-1,3-butanediamine,N,N,N',N'-tetramethylethylenediamine, N,N,N',N'-tetramethylhexanediamine-1,6, N,N,N',N',N"-pentamethyl diethylenetriamine, bis(2-dimethylaminoethoxy)-methane, N,N,N'-trimethyl-N'-(2-hydroxyethylethyldiamine, N,N-dimethyl-N',N'-(2-hydroxyethyl)-ethylenediamine, tetramethylguanidine, +methylpiperidine, N-ethylpiperidine, +methylmorpholine, N-ethylmorpholine, 1,4-dimethylpiperidine, 1,2,4-trimethylpiperidine, +(2-dimethylaminoethyl)-morpholine. Examples of commercially available catalysts for use in the polyol component include Dabco S25, and Niax DEOA-LF.

The amine catalysts are usually used in amounts ranging from about 0.1 to about 1.5% by weight, preferably about 0.3% to about 1.1% by weight, based on the total weight of the polyol component.

At least one blowing agent is included in the polyol component. Suitable blowing agents include, for example, water, and physical blowing agents. Useful physical blowing agents include low boiling alkanes, partially or completely fluorinated hydrocarbons, etc. Suitable low boiling alkanes include compounds such as, for example, acetone, pentane, hexane, cyclopentane, etc. Some examples of suitable partially or completely fluorinated hydrocarbons include compounds such as HFC-134a (1,1,1,2-tetrafluoroethane), HFC-245fa (1,1,1,3,3-pentafluoropropane), HFC-245ca (1,1,2,2,3-pentafluoropropane), HFC-236ca (1,1,1,2,3,3-hexafluoropropane). Methylene chloride is also a suitable blowing agent for the presently claimed invention. Mixtures of these various blowing agents are also suitable. It is preferred that the blowing agent comprises water.

When water is used as the sole blowing agent, it is typically used in amounts of between about 0.02% to about 1.2% by weight, and preferably between about 0.05% to about 0.7% by weight based on the total weight of the polyol component side of the formulation. In the present invention, blowing agents are added in an amount necessary to produce a foam of the desired density for use as, for example, shoe soles. In shoe soles, the density of the molded foam is usually from about 0.2 to about 1.2 g/cc, preferably 0.4 to about 1.1 g/cc. Normally, densities can be as high as about 1 g/cc to about 1.1 g/cc when used in dual-density shoe soles where a higher density out-sole is attached to a lower-density mid-sole. Chain extenders optionally are most preferably included in the polyol blend. Chain extenders include glycerols and diols which have at least 2 hydroxyl groups and a MW less than about 300. Examples of useful chain extenders are glycerols and diols which have primary hydroxyl groups, glycerols and diols which have secondary hydroxyl groups, and glycerols and diols which have both primary and secondary hydroxyl groups. Preferably, the chain extenders are diols which have primary hydroxyl groups and a molecular weight of more than about 62. Examples of these chain extenders include but are not limited to ethylene glycol, diethylene glycol, 1,4 butane diol, 2,3 butanediol, and 1,2 propane diol, preferably 1,4 butane diol and ethylene glycol.

Various additives may be included in the polyol component. Examples of suitable additives include surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may be used as surface-active additives. Other additives which may be used in the molding compositions of the present invention include known internal mold release agents, pigments, cell regulators, flame retarding agents, plasticizers, dyes, fillers and reinforcing agents such as glass in the form of powder and antistatic agents. Examples of fillers include calcium carbonate, talc, magnesium hydroxide, mica, clay, barium sulfate, natural silica, synthetic silica (white carbon), titanium oxide, and carbon black. Among those, barium sulphate and synthetic silica are preferred.

Foam stabilizers which also optionally may be employed include water-soluble polyether siloxanes. The structure of these compounds is generally that of a copolymer of ethylene oxide and propylene oxide attached to a polydimethyl siloxane. A preferred foam stabilizer is the silicone surfactant available from Air Products Co. under the tradename DC-193.

Isocyanate prepolymers are employed in preparation of the foams of the present invention. The prepolymer preferably has an NCO value of about 15 to abut 26%, more preferably about 16–21%, and a functionality of 2.0 to 2.5, more preferably from 2.0 to 2.1.

Isocyanate terminated prepolymers can be formed by a variety of methods known in the art. Suitable isocyanate-terminated prepolymers can be prepared by reacting an excess of polymeric or di-isocyanate with polyols, including aminated polyols, imine- or enamine-modified polyols, polyether polyols, polyester polyols or polyamines. The prepolymer then can be mixed with one or more additives such as MDI derivatives, plasticizers as and stabilizers. One or more chain extenders also may be used to replace the polyol (or a portion of polyols) to make the prepolymer.

Examples of suitable prepolymers for use in the invention include prepolymers formed from Stepanpol PS 1752 and MDI, aromatic polyols such as Bisphenol A, and aliphatic polyols. Examples of commercially available prepolymers which may be used in the invention include Suprasec 2000, Suprasec 2544, Suprasec 2980, and Suprasec 2433.

Manufacture of Polyester Polyurethanes

The B side (polyol component) and A-side (isocyanate prepolymer) can be reacted at indices of about 92 to about 106, preferably about 96 to about 100, most preferably about 98 to produce polyester polyurethanes. During manufacture of the polyester polyurethanes, additives, if employed, are incorporated into the "B" side component, although they may be added into the "A" side component provided that they are not isocyanate-reactive.

The components included in the "B" side, including additives, may be blended or agitated in a container or supply tank at a temperature of of about 20° C. to about 75° C., preferably about 20° C. to about 50° C. Agitation can be performed with conventional propeller type stirrers at about 50 to about 200 RPM.

Examples of specific B-side formulations and isocyanates are shown in Table 1. In Table 1, Example 1 is conventional shoe sole formulation in which the only polyol is the commercially available aliphatic polyester polyol Daltorez P778. Example 2 is similar to Example 1 but includes 1% Staboxyl I, carbodiimide. Examples 3 and 4 employ o-phthalic ester polyols such as Stepanpol PS 1752 with aliphatic ester polyols such as Daltorez P778 and Daltorez P 716. All amounts shown in Table 1 are in wt. % based on the total weight of the B-side.

TABLE 1

| Example/Component | Example 1 | Example 2 | Example 3 | Example 4 |
|---|---|---|---|---|
| Dabco S 25 | 4.39 | 4.39 | 4.00 | 2.8 |
| Daltorez P 716 | + | + | + | 70.6 |
| Daltorez P 778 | 90.58 | 90.58 | 74.00 | + |
| DC-193 | + | + | + | 0.30 |
| Niax DEOA-LF | + | + | + | 0.47 |
| Staboxyl I | + | 1.00 | + | + |
| Stepanpol PS1752 | + | + | 16.6 | 15.9 |
| Water | 0.05 | 0.05 | 0.05 | 0.33 |
| 1,4 butanediol | 4.98 | 4.98 | 5.00 | 9.6 |
| Isocyanate Prepolymer | Suprasec 2000 | Suprasec 2000 | Suprasec 2000 | Suprasec 2000 |
| Index | 98 | 98 | 98 | 98 |

Manufacture of Molded Polyester Polyurethanes

In manufacture of molded polyester polyurethanes, the "A" side and "B" side components are placed in separate containers equipped with agitators. The temperature of each component can vary from ambient to about 70° C.

Molded shoe soles are made by supplying each of the "A" and "B" side components via metering pumps to a mixing head where they are mixed at pressures of up to about 30 bar, preferably of up to about 20 bar. During mixing, the temperature of the B side is about 40° C. and the temperature of the A side is about 35° C. The resulting mixture of A and B components is poured or injected into a mold.

After the mold is filled, the mold is closed and the mixture is cured at about 30° C. to about 60° C. for about 1 to 30 minutes, preferably at about 45° C. to about 55° C. for about 2 to 10 minutes.

Molded shoe soles also can be formed as duel density shoe soles. Dual density shoe soles are made by a two-step injection method. In the first step, the mixture of A-side and B-side components is injected into a dual density mold cavity such as a Caroline Boots dual density shoe mold from Amtrial, Inc. The dual density mold cavity includes closed mold cavity that is surrounded by an upper mold, a bottom mold and side rings to produce a thin outsole elastomer. When the outsole elastomer is cured in the mold, the upper mold is removed to provide space for making a midsole. The shoe upper is present as a part of an outer mold.

In the second step, another mixture of A-side and B-side components is injected into the mold between the shoe upper and the outsole to produce a midsole foam between the outsole and the shoe upper. The outsole and shoe upper then are glued together.

The polyester polyurethanes produced as described above are evaluated for flexural strength, tensile strength, and tensile strength after aging in a humid environment. The flexural strength of the polyester polyurethanes are evaluated according to the Ross Flexural test described in ASTM-D-1052-85. In the Ross Flexural test, polyester polyurethane sheets which measure 6"×1"×¼" are used. The sheets are formed with a 0.08 inch crack and are repeatedly bent over a 25 mm diameter mandrel. Sheets which survive 50 kilo cycles (KCS) of bending at room temperature and 40 kilo cycles at −15° C. are acceptable.

The tensile strength after aging in humid environments of the polyester polyurethanes are evaluated in accordance with ASTM D 412-92. Sheets of polyester polyurethanes which measure 6"×1"×⅛" are used in ASTM D 412–92. Retention of tensile strength is calculated from the tensile strength before and after humid aging at 70° C., 100% relative humidity for seven days. The results are shown in Table 2.

The flexural strength of dual density shoe soles which utilize polyester polyurethanes is evaluated according to the Bata Belt Test described in SATRA Test method PM 133 published by the SATRA Technology Center, UK. Shoe soles which survive 35–50 kilo cycles of bending are considered as low risk for fatigue cracking and are acceptable. The results are shown in Table 2.

TABLE 2

| Sample No. | Composition of Sample | Tensile Strength Before Aging, PSI | Tensile Strength After Aging, PSI | Tensile Strength Retention, % | Ross Flex, RT, −15C KCS | | Bata Belt Flex, KCS | Index | Density, g/cc |
|---|---|---|---|---|---|---|---|---|---|
| 1 | Example 1 | 2924 | 718 | 24.6 | 50 | 50 | 50 | 96 | 1.0–1.1 |
| 2 | Example 1 | 3278 | 907 | 27.7 | 50 | 50 | 45 | 98 | 1.0–1.1 |
| 3 | Example 1 | 3302 | 1223 | 37.0 | 50 | 50 | 40 | 100 | 1.0–1.1 |
| 4 | Example 2 | 3325 | 1830 | 55.0 | 50 | 50 | 50 | 96 | 1.0–1.1 |
| 5 | Example 2 | 3001 | 2151 | 71.7 | 50 | 45 | 45 | 98 | 1.0–1.1 |
| 6 | Example 2 | 3296 | 2123 | 64.4 | 50 | 40 | 40 | 100 | 1.0–1.1 |
| 7 | Example 3 | 2548 | 1633 | 64.1 | 50 | 50 | 50 | 96 | 1.0–1.1 |
| 8 | Example 3 | 2825 | 2627 | 93.0 | 50 | 50 | 45 | 98 | 1.0–1.1 |

TABLE 2-continued

| Sample No. | Composition of Sample | Tensile Strength Before Aging, PSI | Tensile Strength After Aging, PSI | Tensile Strength Retention, % | Ross Flex, RT, KCS | Ross Flex, −15C KCS | Bata Belt Flex, KCS | Index | Density, g/cc |
|---|---|---|---|---|---|---|---|---|---|
| 9 | Example 3 | 2903 | 2592 | 89.3 | 50 | 45 | 40 | 100 | 1.0–1.1 |
| 10 | Example 4 | 880 | 908 | 102.7 | 50 | 50 | 50 | 96 | 0.45–0.55 |
| 11 | Example 4 | 812 | 1008 | 124.1 | 50 | 50 | 50 | 98 | 0.45–0.55 |
| 12 | Example 4 | 845 | 849 | 100.5 | 50 | 50 | 50 | 100 | 0.45–0.55 |

As shown in Table 2, samples 7–9 which employ the compositions of Example 3 retain as much as 93% of their original tensile strength. This exceeds the highest level of tensile strength retention achievable with prior art compositions which employ aliphatic polyester polyols which include Staboxyl I carbodiimide.

To further illustrate the invention, modified o-phthalate ester polyols are evaluated for use with adipic acid based polyester polyols at various indices. Prepolymers formed from the modified polyols are also evaluate. These modified polyols are referred to as P 1752M and P 3152M. The prepolymer is referred to as S 2000M. The compositions evaluated are shown in Table 3.

P 1752M is made using Stepanpol PS 1752 and adipic acid in the weight ratio of Stepanpol PS 1752/adipic acid of 44/56. P 1752M is made by charging Stepanpol PS 1752 to a reactor and then heating it until the temperature of the polyol reaches 115° C. Adipic acid is added and the temperature of the reactor is raised to 150° C. with agitation. A partial vacuum of 20 inches Hg is maintained and the temperature is maintained below 230° C., preferably about 200° C. to about 220° C. When the acid number of the reaction mixture is less than 2 as determined by titration, a vacuum of less than two inches Hg is applied until the reaction mixture achieves an $OH_v$ of 72–78.

P 3152M, having a MW of 1450, is made in accordance with the following two step procedure. In step 1, Stepanpol SP 3152 is reacted with adipic acid at the weight ratio of Stepanpol SP 3152:adipic acid of 1:2 to achieve an acid terminated intermediate. Stepanpol SP 3152 is added to the reactor and heated to 115° C. Adipic acid is added to the reactor and the temperature raised to 150° C. with agitation and under a partial vacuum of 20 inches Hg. The reaction is continued for 2 hours while maintaining the temperature below 230° C., preferably about 200° C. to about 220° C. The resulting acid terminated intermediate then is cooled to 115° C. use in step 2.

In step 2, the acid terminated intermediate is reacted with ethylene glycol at the molar ratio of acid terminated intermediate:ethylene glycol of 2:3. Ethylene glycol is charged to the reactor having the acid terminated intermediate that is at 115° C. with agitation. The temperature is raised to 150° C. under a partial vacuum of 20 inches Hg. The reaction is continued for two hours and the temperature is maintained below 230° C., preferably about 200° C. to about 220° C. When the acid number of the reaction mixture is less than 2 as determined by titration, a vacuum of less than two inches Hg is applied until a OHv of 72–78 is achieved.

TABLE 3

| Sample | Daltorez P778, PBW | P 3152 M, PBW | P 1752 M, PBW | Isocyanate | Index |
|---|---|---|---|---|---|
| 13 | 56 | 34.6 | 0 | 52000[1] | 96 |
| 14 | 56 | 34.6 | 0 | 52000 | 98 |
| 15 | 56 | 34.6 | 0 | 52000 | 100 |
| 16 | 40.6 | 50 | 0 | 52000 | 96 |
| 17 | 40.6 | 50 | 0 | 52000 | 98 |
| 18 | 40.6 | 50 | 0 | 52000 | 100 |
| 19 | 52.9 | 0 | 37.7 | 52000 | 96 |
| 20 | 52.9 | 0 | 37.7 | 52000 | 98 |
| 21 | 52.9 | 0 | 37.7 | 52000 | 100 |
| 22 | 37.7 | 0 | 52.9 | 52000 | 96 |
| 23 | 37.7 | 0 | 52.9 | 52000 | 98 |
| 24 | 37.7 | 0 | 52.9 | 52000 | 100 |

[1]Suprasec 2000

TABLE 4

| Sample | Tensile w/o aging, PSI | Tensile w/7 days Aging[1], PSI | Tensile Retention, % | Ross Flex @ −15C. KCs | Bata Belt Flex., KCs |
|---|---|---|---|---|---|
| 13 | 2428 | 1648 | 67.9 | 45 | 50 |
| 14 | 2507 | 1886 | 75.2 | 45 | 50 |
| 15 | 2641 | 1866 | 67.9 | 35 | 45 |
| 16 | 1910 | 1617 | 84.7 | 35 | 50 |
| 17 | 2401 | 1840 | 76.6 | 25 | 20 |
| 18 | 3066 | 1788 | 58.3 | 25 | 35 |
| 19 | 2433 | 1502 | 61.7 | 25 | 50 |
| 20 | 2344 | 1775 | 75.7 | 25 | 30 |
| 21 | 2951 | 1706 | 57.8 | 40 | 50 |
| 22 | 2341 | 1487 | 63.5 | 30 | 30 |
| 23 | 2424 | 1701 | 70.2 | 10 | 20 |
| 24 | 2484 | 1704 | 68.6 | 10 | 15 |

The polyester polyurethanes prepared have excellent hydrolysis resistance and mechanical characteristics, including abrasion resistance, durability, stability and flexibility, making them ideal for use as a shoe sole.

What is claimed is:

1. A polyurethane elastomer having improved hydrolysis resistance comprising the reaction product of
    a first component comprising a polyol blend having
        an aliphatic dicarboxylic acid based polyester polyol,
        an aromatic dicarboxylic acid based polyester polyol,
        chain extender and a blowing agent, and
    a second component having an isocyanate terminated prepolymer, wherein in the first component, the aromatic dicarboxylic acid based polyester polyol is the reaction product of an aliphatic alcohol and ortho-phthalic acid, and wherein the aromatic dicarboxylic acid based polyol is present in the polyol blend in an amount of about 12 wt. % to about 26 wt. % based on the total weight of the polyester polyols.

2. The polyurethane elastomer of claim 1 wherein the aliphatic alcohol is selected from the group consisting of ethylene glycol, diethylene glycol, hexanediol, 1,4 butanediol, neopentyldiol, and mixtures thereof.

3. The polyurethane elastomer of claim 1 wherein the aliphatic dicarboxylic acid is selected from the group consisting of adipic acid, succinic acid, glutaric acid, and suberic acid.

4. The polyurethane elastomer of claim 2 wherein the amount of aromatic dicarboxylic acid polyester polyol is about 15 wt. % to about 20 wt. % of the total weight of the polyester polyols.

5. The polyurethane elastomer of claim 1 wherein the isocyanate terminated prepolymer having about 17% NCO that is the reaction product of diphenylmethane diisocyanate and a polyester polyol that is the reaction product of a blend of ethylene glycol/diethylene glycol with adipic acid.

6. The polyurethane elastomer of claim 5 wherein the aliphatic dicarboxylic acid based polyester polyol is the reaction product of adipic acid and a mixture including diethylene glycol and ethylene glycol.

7. The polyurethane elastomer of claim 6 wherein the aliphatic dicarboxylic acid based polyester polyol has an OH value of about 36 to about 56.

8. The polyurethane elastomer of claim 1 wherein the blowing agent is selected from the group consisting of water, acetone, pentane, hexane, cyclopentane, (1,1,1,2-tetrafluoroethane), (1,1,1,3,3-pentafluoropropane),(1,1,2,2,3-pentafluoropropane), (1,1,1,2,3,3-hexafluoropropane), and methylene chloride.

9. The polyurethane elastomer of claim 8 wherein the blowing agent is water.

10. The polyurethane elastomer of claim 8 wherein the blowing agent is water in an amount of about 0.02% to about 1.2% by weight based on the total weight of the polyol component.

11. The polyurethane elastomer of claim 1 wherein the isocyanate terminated prepolyiner has an about 18.7% NCO to about 19.3% NCO content.

12. The polyurethane elastomer of claim 1 wherein the isocyanate terminated prepolymer has an NCO content of about 19% and is the reaction product of diphenylmethane diisocyanate, uretonimine modified diphenylmethane diisocyanate, polyester polyol and polyether polyol.

13. The polyurethane elastomer of claim 12 wherein polyester polyol is the reaction product of ethylene glycol, 1,4 butane diol, and adipic acid, and the polyether polyol is ethylene oxide capped diol.

14. The polyurethane elastomer of claim 1 wherein the chain extender is selected from the group consisting of ethylene glycol, diethylene glycol and 1,4 butanediol.

15. A polyurethane elastomer having improved hydrolysis resistance comprising the reaction product of
    a first component comprising a polyol blend having
        an ortho-phthalic acid based polyester polyol formed as the reaction product of diethylene glycol with ortho-phthalic acid, the ortho-phthalic acid being substantially free of each of tere-phthalic acid and isoph-thalic acid, the ortho-phthalic acid based polyester polyol being about 15 wt. % to about 20 wt. % of the total weight of the polyester polyols,
        an adipic acid based polyester polyol formed as the reaction product of adipic acid and a mixture of ethylene glycol and diethylene glycol, and
        water as a blowing agent, and
    a second component that is a diphenylmethane diisocyanate prepolymer having about 15% to about 24% NCO.

16. The polyurethane elastomer of claim 15 wherein the aromatic polyester polyol is the reaction product of a diethylene glycol-orthophthalic anhydride based polyester polyol and adipic acid in the weight ratio of the polyester polyol to the adipic acid of 44/56.

17. The polyurethane elastomer of claim 15 wherein the aromatic polyester polyol is the reaction product of an acid terminated intermediate with ethylene glycol at the molar ratio of acid terminated intermediate:ethylene glycol of 2:3, wherein the acid terminated intermediate is the reaction product of a diethylene glycol-phthalic anhydride based polyester polyol and adipic acid of a weight ratio of the diethylene glycol-phthalic anhydride based polyester polyol to the adipic acid of 1:2.

* * * * *